United States Patent [19]

Aeppli

[11] Patent Number: 5,074,480
[45] Date of Patent: Dec. 24, 1991

[54] PROCESS AND APPARATUS FOR DETERMINING THE YARN SPEED ON TEXTILE MACHINES

[75] Inventor: Kurt Aeppli, Uster, Switzerland

[73] Assignee: Zellweger Uster AG, Uster, Switzerland

[21] Appl. No.: 533,512

[22] Filed: Jun. 5, 1990

Related U.S. Application Data

[63] Continuation-in-part of Ser. No. 233,484, Aug. 18, 1988, abandoned.

[30] Foreign Application Priority Data

Sep. 1, 1987 [CH] Switzerland .................. 03348/87

[51] Int. Cl.⁵ .......................................... B65H 63/00
[52] U.S. Cl. .................................................. 242/36
[58] Field of Search .............. 242/36, 39, 28, 30, 242/49

[56] References Cited

U.S. PATENT DOCUMENTS

| | | | |
|---|---|---|---|
| 3,258,824 | 7/1966 | Gith | 242/36 X |
| 3,592,400 | 7/1971 | Gith | 242/36 |
| 3,739,996 | 6/1973 | Matsui et al. | 242/36 X |
| 3,801,031 | 4/1974 | Kamp et al. | 242/36 |
| 4,024,645 | 5/1977 | Giles | 242/36 X |
| 4,214,717 | 7/1980 | Makino et al. | 242/36 |

FOREIGN PATENT DOCUMENTS

| | | | |
|---|---|---|---|
| 2428110 | 1/1976 | Fed. Rep. of Germany | 242/36 |
| 2951552 | 7/1981 | Fed. Rep. of Germany | 242/36 |
| 974296 | 11/1964 | United Kingdom | 242/36 |

Primary Examiner—Stanley N. Gilreath
Attorney, Agent, or Firm—Burns, Doane, Swecker & Mathis

[57] ABSTRACT

A yarn is wound onto a generally conical yarn package, using a cam cylinder to traverse the yarn back and forth between the ends of the package. A first sensor is used to determine the rotational position of an element which is rotating synchronously with the package. The position of the yarn lengthwise of the package is determined using a second sensor. A correction factor is obtained for determining an instantaneous yarn feeding speed from an average yarn speed value obtained from the peripheral speed of the rotating element. The improved yarn speed determination enables on-line spectrograms to be provided on yarns handled in these machines. Also, there is considerably greater accuracy when measuring lengths of yarn defects.

18 Claims, 6 Drawing Sheets

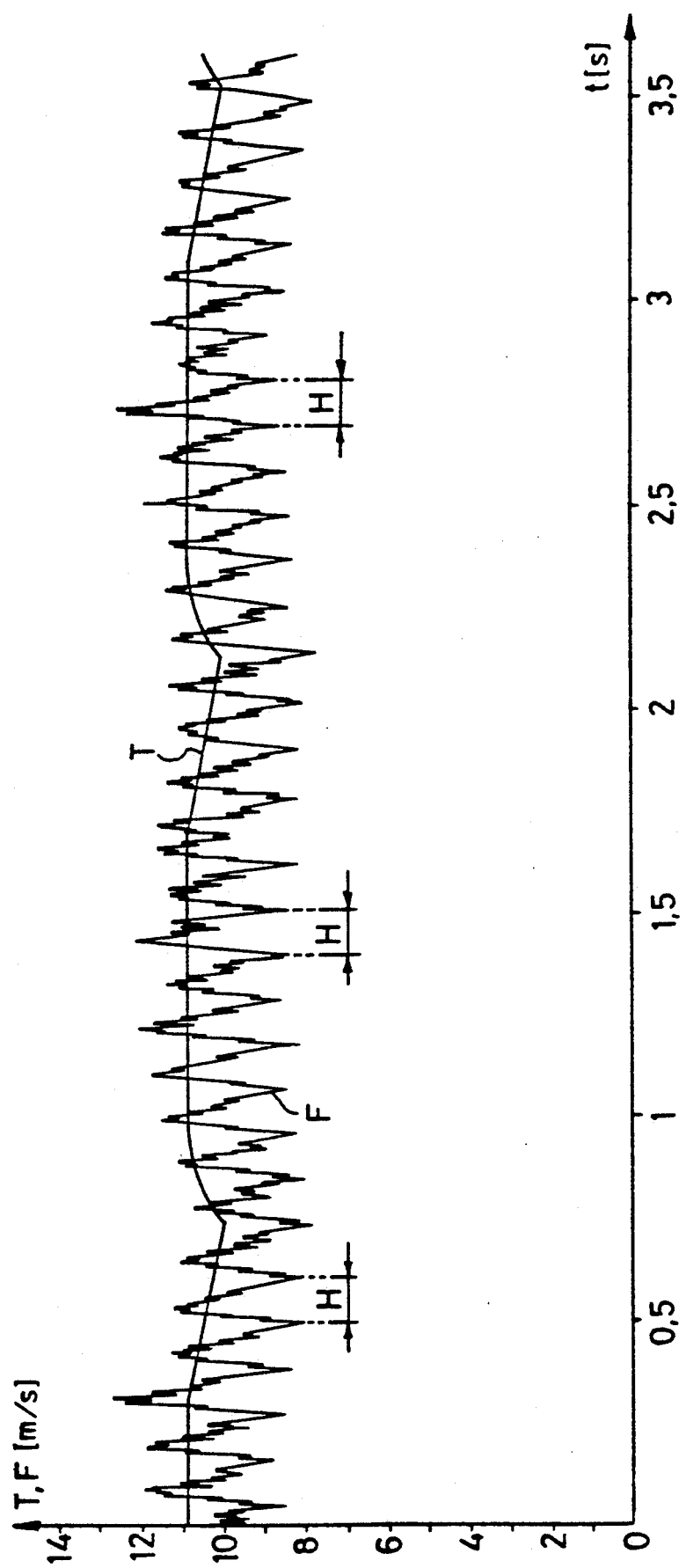

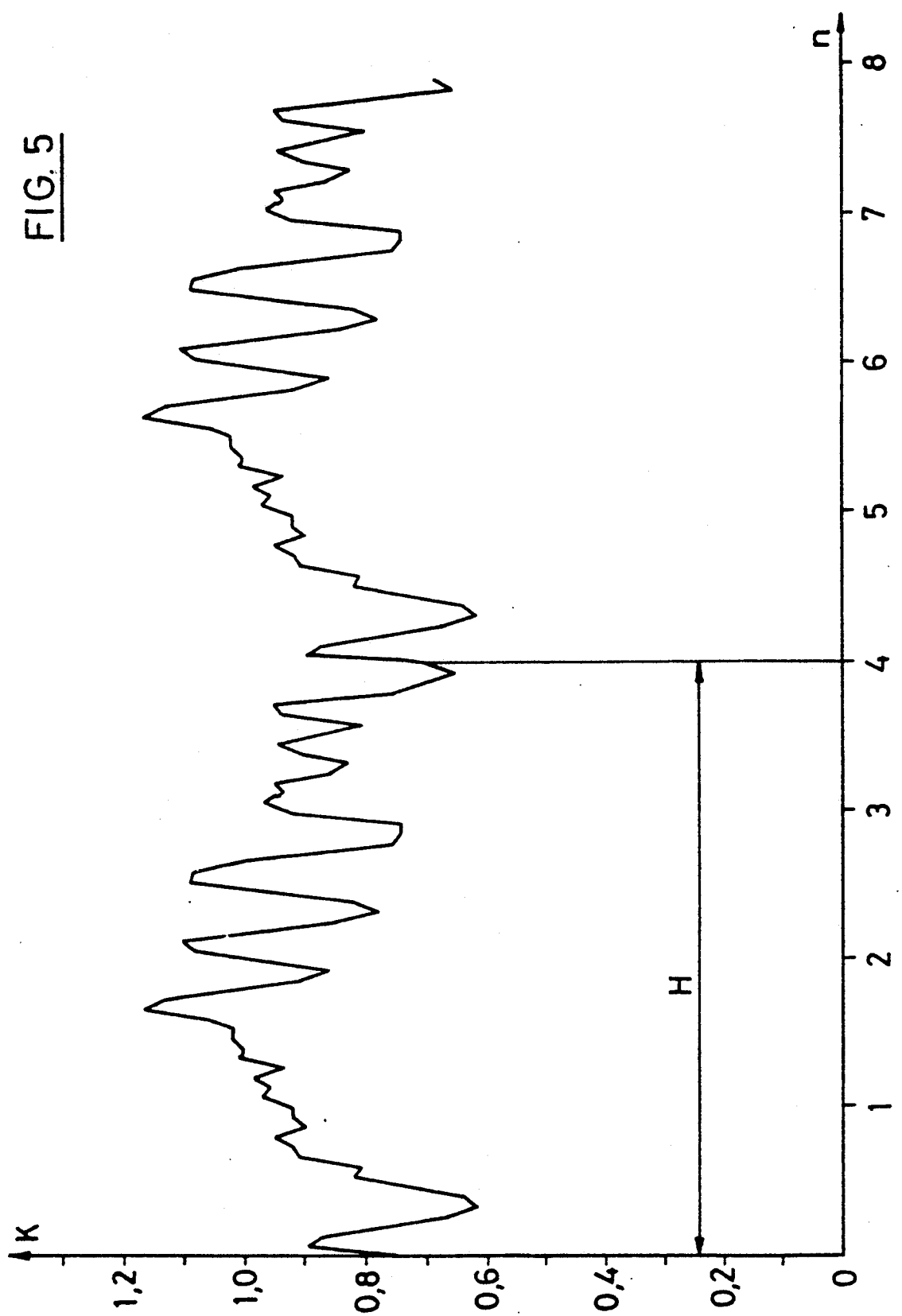

PROCESS AND APPARATUS FOR DETERMINING THE YARN SPEED ON TEXTILE MACHINES

CROSS REFERENCE TO RELATED APPLICATION

This is a continuation-in-part of application Ser. No. 233,484 filed Aug. 18, 1988, now abandoned.

FIELD OF THE INVENTION

The present invention relates to a process for determining yarn speed in textile machines of the type in which the yarn is wound onto a rotating, generally conical, package while being traversed along the length of such package. More particularly, the invention is concerned with textile apparatus of the type wherein yarn is wound in cross coil fashion onto a cheese bobbin using a driven cam cylinder linked to the cheese bobbin so that both are driven together.

BACKGROUND OF THE INVENTION

Swiss Patent Application No. CH-A-636,323, published May 31, 1983, discloses a process in which the peripheral speed of an element which rotates synchronously with the running yarn speed is calculated using a pulse generating encoder. When the yarn speed is calculated in this way, an average value is attained, which is not always adequate in practice, since short fluctuations in the instantaneous speed cause inaccuracies when calculating certain yarn parameters.

When the yarn is wound on a very conical yarn package such as a cheese bobbin the winding diameter can differ by more than 200% between the small and large ends of the package. This results in instantaneous variations in the yarn speed, which are approximately equal, depending on whether the yarn is wound onto the small or large end portion of the package diameter. Such variations can render a spectrogram calculation unusable if immediately applied to spooling frames, or they can also cause considerable inaccuracies when calculating yarn parameters such as the lengths of slubs and neps.

OBJECT AND SUMMARY OF THE INVENTION

It is an object of the present invention to improve yarn speed calculation processes of the type used heretofore by taking into account the instantaneous variations in the yarn speed when calculating yarn speed values to be used in connection with various testing procedures and the like.

This object is accomplished according to the invention by determining the cheese bobbin diameter and the instantaneous position of the yarn along the lengthwise dimension of the cheese bobbin, and by deriving a correction factor to calculate the instantaneous yarn speed from an average yarn speed obtained from the peripheral speed of a rotating element.

According to the invention, the process for determining the yarn speed on textile machines such as spooling frames can be improved to such an extent that on-line spectrograms can be calculated on yarns being handled in these machines. In addition, considerably greater accuracy is achieved when measuring the lengths of yarn defects.

The invention also relates to apparatus for carrying out the described process. Such apparatus has a first sensor for the peripheral speed of the rotating element, a processor for evaluating the signals delivered by the sensor, and a second sensor also connected to the processor so as to permit determination of the instantaneous position of the yarn on the cheese bobbin.

These and other features and advantages of the invention are described in greater detail hereinafter with reference to a preferred embodiment of the invention illustrated in the accompanying drawings.

BRIEF DESCRIPTION OF THE DRAWINGS

FIG. 4 is a graph of cam cylinder speed and instantaneous yarn speed over time;

FIG. 5 is a graph illustrating the yarn speed correction factor versus revolutions of the cam cylinder.

DETAILED DESCRIPTION OF PREFERRED EMBODIMENTS

Figure 2:
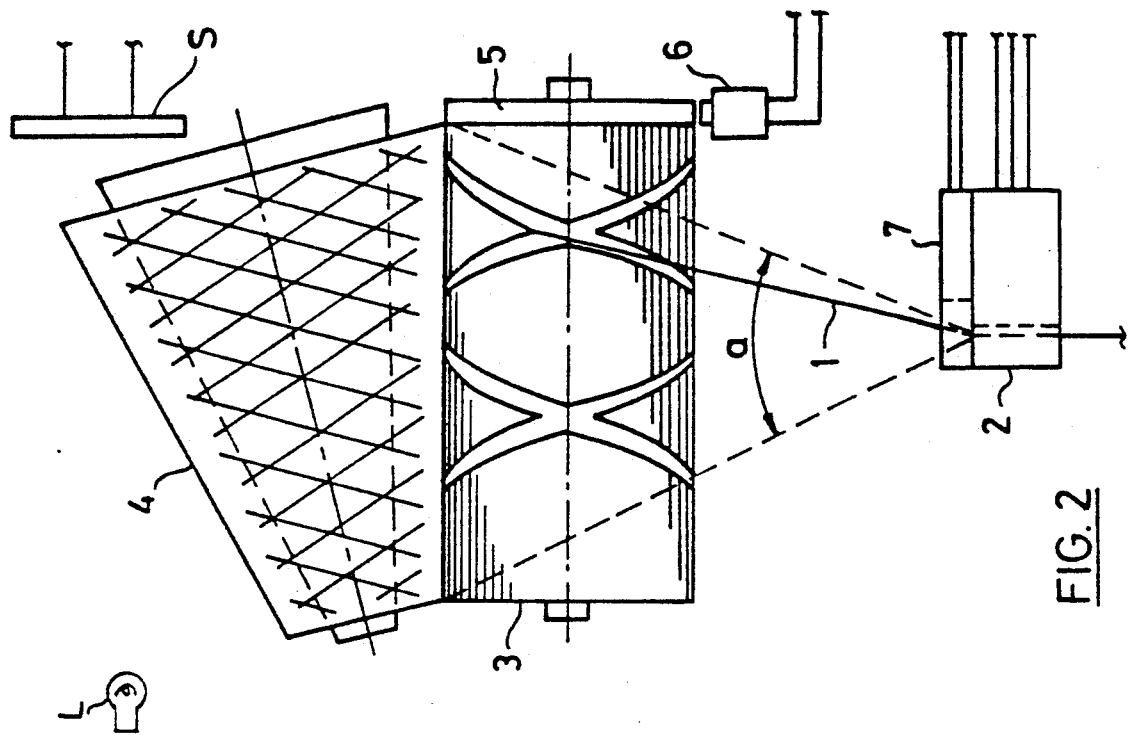
FIG. 2 is an embodiment of a view in elevation of the apparatus of FIG. 1, viewed in the direction of the arrow II in FIG. 1.
Figure 1:
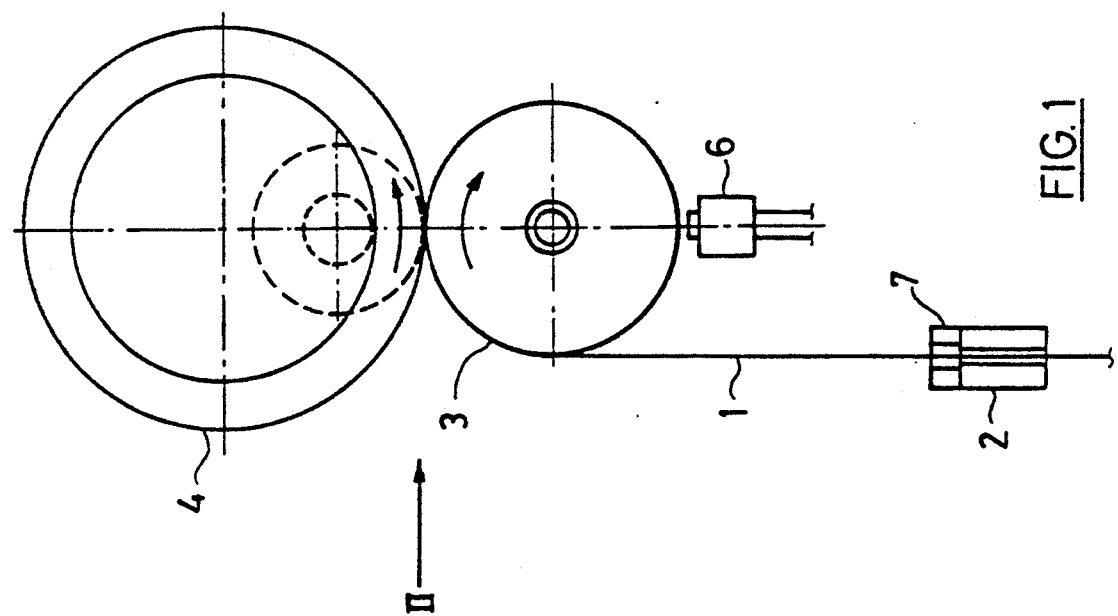
FIG. 1 is a schematic diagram of part of a textile machine embodying apparatus which implements the principles of the present invention.
Figure 2A:
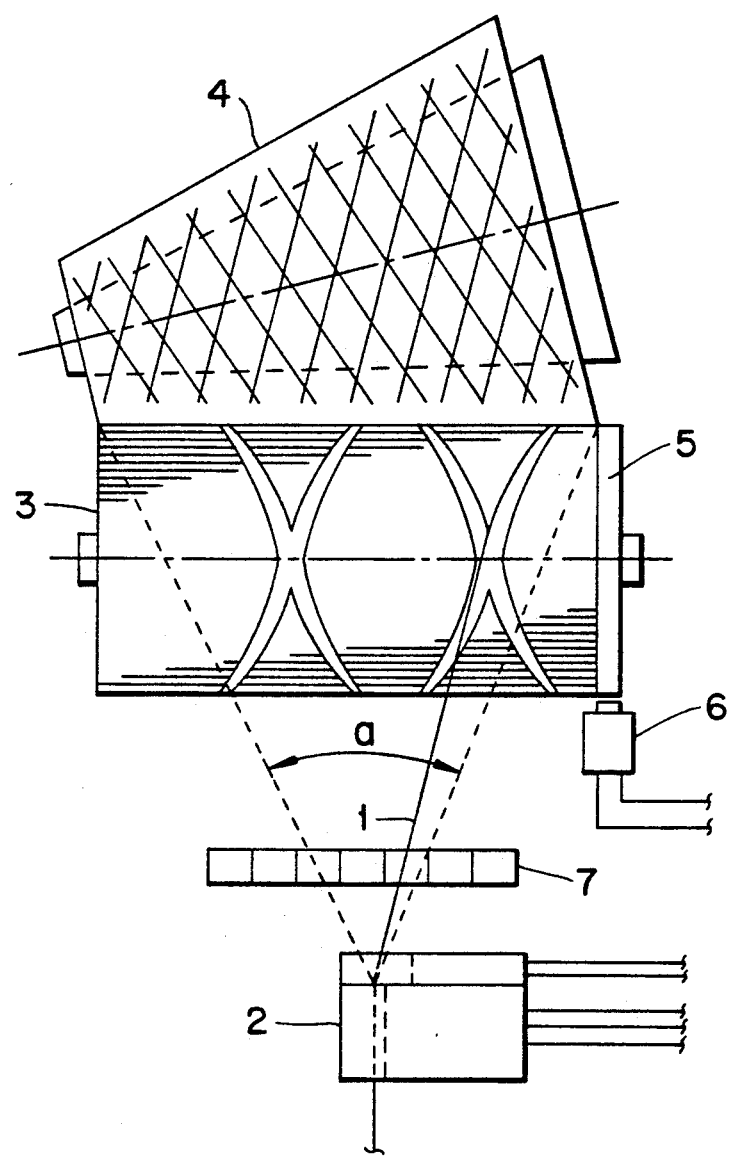
FIG. 2a is another embodiment of a view in elevation of the apparatus of FIG. 1, viewed in the direction of the arrow II in FIG. 1.

FIGS. 1, 2 and 2a illustrate sections of a spooling frame of the type on which the process of the invention and the corresponding apparatus can be advantageously employed. A thread or yarn 1 runs through a measuring head 2 which locates defects in the yarn in a known way, and the yarn may be severed by a built-in cutting device, to enable removal of the defects. The yarn 1 subsequently runs over a cam cylinder 3 and is wound onto a cheese bobbin 4. The cam cylinder is driven and the cheese bobbin 4 rotates with it due to frictional contact. The peripheral speed of the yarn package 4 at a cross-section located between the ends will be the same as the peripheral speed of the cam cylinder 3 which drives the package 4. The peripheral speed of the cam cylinder 3 therefore determines the winding speed of the yarn and its running speed through the measuring head 2.

The speed of the cam cylinder 3 is used to provide a time base for calculating the lengths of the defective areas detected by the measuring head 2. For this purpose, markings on a strip 5 on the jacket of the cam cylinder are scanned by a first sensor 6 and converted into pulses of equal length when the cylinder is rotating at uniform speed. Since these markings and the scanning thereof are not the object of the present invention they are not described in detail herein. In this connection reference may be made to Swiss Patent Application No. CH-A-636,323, published on May 31, 1983, which is incorporated herein by reference.

The signals delivered by the first sensor 6 as it scans the markings on the strip 5 provide a measurement for the average speed of the yarn 1. However, the instantaneous speed of the yarn varies with the position of the yarn and with the diameter of the cheese bobbin 4. Depending on how conical the cheese bobbin 4 is, the speeds attained when winding on the largest and smallest diameters thereof can be in the ratio of 3:1 or even larger.

More particularly, when the cam cylinder 3 is driven at a defined speed, every point along a generatrix of its surface has the same circumferential speed. The cheese bobbin 4 is in contact with the cam cylinder 3 along a generatrix of its conical surface. However, every point in this generatrix of the cheese bobbin 4 is not driven at the same circumferential speed as the circumferential speed of the cam cylinder 3. If the circumferential speed of the cheese bobbin were the same at the large and at the small ends of the cheese bobbin, the speed of rotation would be different at the two ends, which is impossible. Rather, there is slip along the line of contact between the cam cylinder 3 and the cheese bobbin 4, except there is one point on the line of contact that is without slip. The precise position of this slipless point depends upon many effects. For the purposes of the present invention it is not essential that these effects be individually identified. Rather it is only necessary to compensate for the slippage, regardless of its actual cause.

According to the invention, a second sensor means 7 measures the yarn position along the lengthwise direction of the cheese bobbin 4, so that the effective instantaneous speed of the yarn 1 can be determined. A correction factor from a predetermined table can be derived from the yarn position and the instantaneous diameter of the cheese bobbin 4 for a given spooling frame. Using this correction factor, the instantaneous yarn speed can be calculated from the nominal or average value derived from signals from the first sensor 6. This gives the formula: instantaneous yarn speed F equals average yarn speed T times correction factor K.

Use of the instantaneous yarn speed calculated in this manner makes it feasible to immediately prepare on-line spectrograms for the yarn on the spooling frame. Also, considerably greater accuracy is achieved when measuring the lengths of the yarn defects detected by the measuring head 2.

The instantaneous diameter of the cheese bobbin 4 is a function of how much yarn already has been wound on the cheese bobbin. It can be determined either directly by an additional sensor such as a light sensitive array S that is responsive to a light beam from a source L, or a feeler gauge (not shown) that rests on the top of the package. Alternatively, the diameter of the package can be determined indirectly by a process of calculation on the basis of defined spool parameters, such as initial diameter, full-spool diameter and the number of revolutions made by the cam cylinder 3 to fill the spool.

There are several possible embodiments and arrangements for the second sensor means 7. Such sensor means 7 may be mounted for example either close to the jacket of the cam cylinder 3, or incorporated within the measuring head 2, as shown in FIG. 2. Moreover, the sensor means 7 may take the form of a row of sensors (e.g. photodiodes) across the entire cross-winding path (a) of the yarn 1 as shown in FIG. 2a. Alternatively a sensor at one or both reversing point(s) of the cross-winding path (a) may sense the presence of the yarn at such end positions (e.g. the yarn 1 may interrupt a light beam of a sensing system at the reversing point or points) as shown in FIG. 2a. In the first case, every point of the yarn position is immediately determined In the second case, only the two end points (or even only one of them) are detected, and the remaining points are determined using the pulses from the first sensor 6, since the number of revolutions of cam cylinder 3 is known between successive interruptions of the light beam by the yarn 1.

Figure 3:
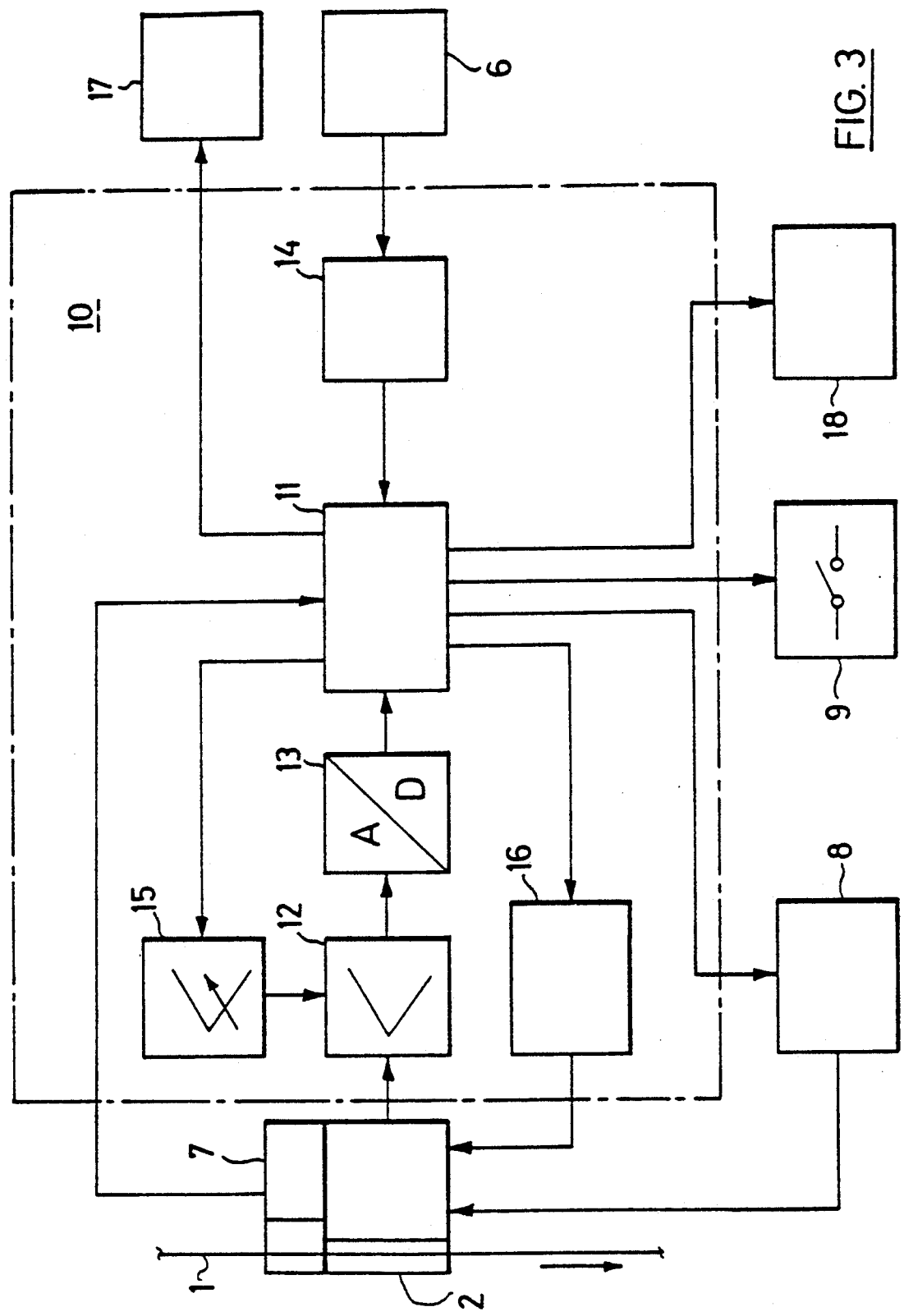
FIG. 3 is a block diagram of a control system according to the invention.

FIG. 3 shows a block diagram of a yarn speed determination system which operates according to the present invention. As shown in the diagram, the system comprises the measuring head 2, a cutting element 8, braking device 9 where applicable, and an electronic processing and control unit 10 which includes a processor 11. The processor 11 receives signals which pass from the measuring head 2 through an intensifier or amplifier 12 and an analog-to-digital converter 13. It also receives signals passing from the first sensor 6 at the cam cylinder 3 (FIGS. 1 and 2) through a pulse-shaping unit 14, as well as the signals from the second sensor 7 for the yarn position.

These signals are linked within the processor in such a way that the back and forth movements of the yarn, between the large and small ends of the conical package 4, are elevated in conjunction with the package rotation position markings on the cam cylinder to establish where, along the length of the package, the yarn is being drawn onto the package at any given point in time. Hence, the instantaneous value of the yarn speed (and thence what the yarn length would be in a given period of time) is determined by applying the correction factor K to the information from both of the sensors 6 and 7, and is used for further evaluations.

The correction factors K are preferably stored in a table in a memory associated with the processor 11. To produce the table of correction factors K, for various yarn positions on the cheese bobbin 4 and various cheese bobbin diameters, the instantaneous speed F of a test yarn moving at a known speed and the driven cam cylinder speed T are measured; and using the formula $K = F/T$, representative correction factors for the yarn position and cheese bobbin diameter are calculated.

The instantaneous yarn speed F is preferably measured with the aid of a test yarn dyed alternately black and white (with respective fields approximately 1 cm long), and an optical sensor which senses the test yarn, whereby the frequency of the black/white periods is employed to calculate the instantaneous yarn speed F (which is proportional to the detected frequency). In the system of FIGS. 1 and 2 this sensor can be disposed at the location of the measuring head 2. The driven cam cylinder speed T is determined by sensing the markings on the jacket of the driven cam cylinder 3.

FIG. 4 illustrates a diagram of the time variation of the test yarn speed F and driven cam cylinder speed T (in meters per second), with the yarn speed F being determined over a length of about 20 cm. A complete back and forth traverse of the test yarn over the cheese bobbin 4 from one end of the spooled yarn to the other, and back again, is designated H. One back and forth traverse H corresponds, in the illustrated example, to four revolutions of the driven cam cylinder 3.

During a startup phase (not illustrated in FIG. 4), the curve of the driven cam cylinder speed T is approximately trapezoidal in shape, due to the fact that the driving force to the cam is periodically switched on and off, for reasons of "pattern suppression". Namely, the drive is switched on for about one second and off for about 0.4 second, and so forth. When the drive is off, the driven cam cylinder speed T decreases due to friction, and when the drive is switched back on the speed T increases to the nominal value, which is maintained until the next point of switchoff. This increase and decrease in the cam speed can be seen in the shape of the curve T in FIG. 4. In this way the yarn winding is altered such that the corresponding yarn parts become disposed side by side and not superimposed.

The yarn speed F follows these fluctuations in the driven cam cylinder speed T to a certain degree, but in addition has appreciably stronger periodic speed fluctuations. In the system illustrated, during each traverse the yarn speed F rises relatively rapidly from a minimal value to a maximal value, and then decreases somewhat more slowly to a second minimal value.

The correction factor K obtained from the quotient F/T is illustrated in the curve shown in FIG. 5, which curve represents an evaluation of 20 traverses. The correction factor K is plotted against the number of revolutions n of the driven cam cylinder 3. A periodicity of the correction factor K may be detected in FIG. 5, with the length of a period being four revolutions of the driven cam cylinder, corresponding to one complete back and forth traverse H.

The curve of the correction factor K shown in FIG. 5 is represented in Table 1 appearing at the end of this specification. This table contains the results of 60 measurements of instantaneous speed made during one back and forth traverse H of the wound yarn. The 60 individual values correspond to 60 different yarn positions, P 01 to P 60, on the cheese bobbin 4, viz. 30 positions for the forward traverse of the yarn and 30 positions for the reverse traverse of the yarn during a complete back and forth traverse H. As may be seen from the Table, at yarn position P 06 a minimal value Kmin of the correction factor is reached, equal to 0.6181867241, and at yarn position P 26 a maximal value Kmax is reached, equal to 1.1702676437. Thus the ratio of Kmin to Kmax is 1:1.9. The mean value of the correction factor from these 60 values is 0.9053697707.

The values from Table 1 are read into a memory and stored there. For one entire bobbin, a plurality of such tables is prepared and stored in memory, with the individual tables being associated with particular ranges of diameter of the cheese bobbin 4 (measured by the sensor S). The most important effect influencing the position of the slipless point is the geometry of the arrangement of the cam cylinder and cheese bobbin. The geometry which is determined by the design of the individual winding station is constant for a given winding station. Therefore, it is sufficient to derive the correction factor (which depends from the instantaneous positions of the yarn along the lengthwise dimension of the cheese bobbin) for an individual winding station one time. It has been found that a total number of 10 tables of the described type, distributed over the diameter of a complete bobbin is sufficient to obtain accurate readings of instantaneous yarn speed. In other words, the total change in diameter of the package as it is being built can be divided into 10 segments, and one table of the type shown in FIG. 1 can be generated for each segment. Thereafter, during an actual winding operation, the diameter of the wound package is measured and the appropriate table of correction factors is accessed by the processor 11 to determine the instantaneous yarn speed.

Figure 6A:
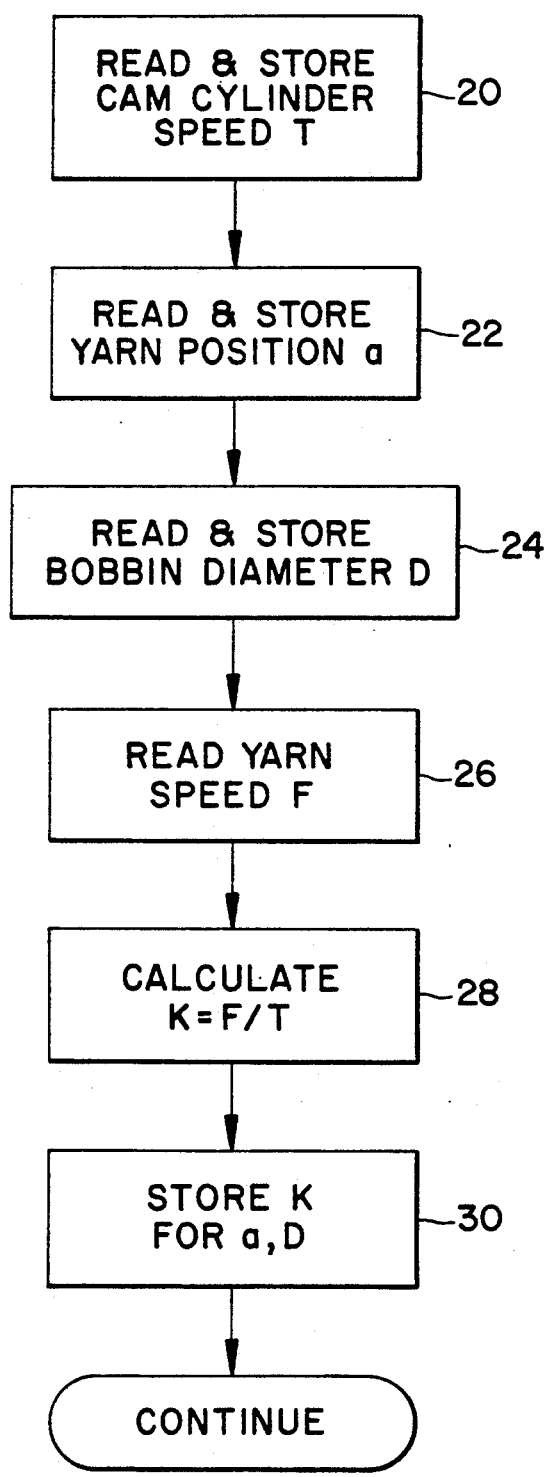
FIGS. 6A and 6B are flow charts illustrating the operation of the processor in the determination of a table of correction factors and instantaneous yarn speed, respectively.

FIG. 6A illustrates a flow chart of the operation that is carried out in the processor 11 to calculate and store the table while a test yarn of the type described previously is being wound on a cheese bobbin. Referring to the flow chart, at step 20 the processor reads and stores the speed T of the cam cylinder 3, as sensed by the sensor 6. It also stores, at step 22, the angular position a of the yarn in its traverse, as determined by the sensor 7. The diameter of the cheese bobbin 4 is measured by the sensor S and stored at step 24. The instantaneous (actual) value of the speed F of the test yarn is measured at step 26, and from this measurement a correction value K=F/T is calculated (step 28). This calculated value is stored in the table on an address determined by the measured diameter D and angular position a (step 30).

This process continues until a suitable number of correction values have been stored. The particular points at which the samples are taken can be determined on any suitable basis. For example, the samples can be taken at regular intervals of time, specified increments of the angular position a, or for a certain number of pulses from the sensor 6.

Figure 6B:
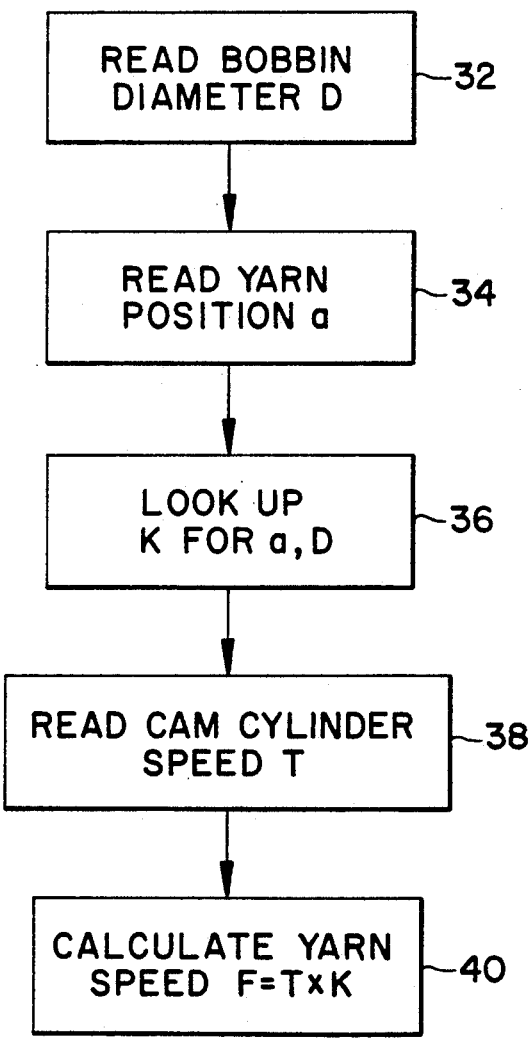

Once the table of correction values is stored, it is used according to the process shown in the flow chart of FIG. 6B. During a winding operation, the diameter D of the yarn package is measured at step 32, and its angular position a is determined (step 34). Using these values, the table is addressed to determine the proper correction value K (step 36), and the speed T of the cam cylinder 3 is measured (step 38). The measured speed is then multiplied by the correction value K retrieved at step 36, to determined the instantaneous yarn speed.

The processor 11 controls the additional functions of adjusting a gain controller 15 in light of the yarn count, accounting for measurement signal drifts in the measuring head 2 through a drift corrector 16, and actuating the cutting element 8 and/or the braking device 9 where necessary. Controlling and monitoring signals can likewise be displayed on an indicator board 17.

Also, the system can easily be equipped with a thread monitor 18. The signals from the measuring head 2 and those from the first sensor 6 are processed in the processor in such a way that the scan results from the measuring head 2 are monitored. If they constantly vary due to the yarn's natural unevenness, an index is created, to enable the yarn to pass through the measuring head 2. However if they remain equal throughout a predetermined number of scan periods, the processor interprets this as an indication that the yarn is missing or has stopped. For example, the yarn probably has broken. The thread monitor 18 can then activate the corresponding control functions.

The invention also has the advantageous feature of being able to combine the signals of the measuring head 2 with those from both sensors 6 and 7. If the signal from the second sensor 7 is omitted during a given number of pulses from the first sensor 6, in spite of a varying signal from the measuring head 2, this may be taken as an indication that the yarn is not traversing properly along the lengthwise direction of the yarn package. In the event of such an occurrence, the winding head should be stopped as quickly as possible and the error should be rectified by the operator.

TABLE 1

| |
| --- |
| P 01: K = 0,7427347885 |
| P 02: K = 0,9011294307 |
| P 03: K = 0,8689623648 |
| P 04: K = 0,7577067615 |
| P 05: K = 0,6783358117 |
| P 06: K = 0,6181867241  $K_{MIN}$ |
| P 07: K = 0,6403923373 |
| P 08: K = 0,7547220838 |
| P 09: K = 0,8230725574 |
| P 10: K = 0,8098389618 |
| P 11: K = 0,9110721003 |
| P 12: K = 0,9175133555 |

TABLE 1-continued

```
P 13: K = 0,9499890292
P 14: K = 0,9036335453
P 15: K = 0,9211537309
P 16: K = 0,9215995055
P 17: K = 0,9696915291
P 18: K = 0,9627039463
P 19: K = 0,9839923262
P 20: K = 0,9386163461
P 21: K = 1,0119071102
P 22: K = 1,0043875884
P 23: K = 1,0233220320
P 24: K = 1,0226616650
P 25: K = 1,0624971335
P 26: K = 1,1702676437 K_{MAX}
P 27: K = 1,1373236496
P 28: K = 0,9952717174
P 29: K = 0,9133177402
P 30: K = 0,8636343080
P 31: K = 0,9958994425
P 32: K = 1,0821176322
P 33: K = 1,1079317164
P 34: K = 0,9451847615
P 35: K = 0,8506265409
P 36: K = 0,7840943223
P 37: K = 0,8319577701
P 38: K = 0,9838645073
P 39: K = 1,0932397109
P 40: K = 1,0878391035
P 41: K = 1,0087066995
P 42: K = 0,8436604164
P 43: K = 0,7541842900
P 44: K = 0,7427303723
P 45: K = 0,7442328355
P 46: K = 0,9213522140
P 47: K = 0,9638109566
P 48: K = 0,9356319273
P 49: K = 0,9520099968
P 50: K = 0,8614736816
P 51: K = 0,8320697958
P 52: K = 0,9069437279
P 53: K = 0,9468280710
P 54: K = 0,8754452731
P 55: K = 0,8021254635
P 56: K = 0,9433332207
P 57: K = 0,9507392315
P 58: K = 0,7571585905
P 59: K = 0,6551048064
P 60: K = 0,6922837208
```

What is claimed is:

1. A process for determining the yarn speed in a textile machine of a type in which the yarn is wound in cross coil fashion onto a cheese bobbin using a driven cam cylinder rotatable with said cheese bobbin, said process including the steps of calculating the peripheral speed of an element which rotates at a speed related to the running yarn speed, determining the instantaneous cheese bobbin diameter and the instantaneous position of the yarn along the lengthwise dimension of the cheese bobbin, deriving a correction factor from said instantaneous cheese bobbin diameter and said instantaneous position of the yarn, and adjusting the value of said calculated peripheral speed by said correction factor to provide a measure of the instantaneous speed of the yarn being wound onto said cheese bobbin.

2. A process according to claim 1 wherein the step of determining the instantaneous diameter of the cheese bobbin is carried out by directly measuring said instantaneous diameter with a sensor.

3. A process according to claim 1, wherein the step of determining the instantaneous diameter of the cheese bobbin is based on the initial bobbin diameter, full bobbin diameter and the number of revolutions made by said rotating element during filling of the bobbin.

4. A process according to claim 1, wherein the adjustment of the value of said calculated peripheral speed to provide said instantaneous yarn speed is carried out by multiplying said correction factor times said peripheral speed.

5. A process according to claim 4, wherein measuring and monitoring of the cross-section of the yarn is carried out to determine whether the cross section varies within a given amount of movement of said rotating element.

6. Apparatus for measuring the instantaneous speed of yarn being wound in a cross-coil fashion onto a cheese bobbin, comprising:
a rotatable cam cylinder that engages said cheese bobbin to impart a rotational force thereto;
a first sensor for sensing the speed of said cam cylinder as it rotates;
a second sensor for measuring the instantaneous position of a yarn along the length of the cheese bobbin;
means for storing correction values; and
a processor for adjusting the sensed speed of said cam cylinder by a correction value determined according to the measured position of the yarn to thereby determine the instantaneous speed of the yarn.

7. Apparatus according to claim 6, wherein said second sensor includes a photoelectric detector positioned at least one of the two inversion points of the crosswinding path of the yarn to detect when the yarn is at said inversion point 8. Apparatus according to claim 7, where the positions of the yarn when it is not at said inversion point are determined by means of signals from the first sensor.

9. Apparatus according to claim 6, wherein the second sensor is made up of a row of photocells disposed along the cross-winding path of the yarn.

10. Apparatus according to claim 6, further including a measuring head positioned in the yarn path upstream of the cam cylinder, said second sensor being mounted between said cam cylinder and said measuring head.

11. Apparatus according to claim 7, further including a measuring head positioned in the yarn path upstream of the cam cylinder, said second sensor being mounted between said cam cylinder and said measuring head.

12. Apparatus according to claim 9, further including a measuring head positioned in the yarn path upstream of the cam cylinder, said second sensor being mounted between said cam cylinder and said measuring head.

13. Apparatus according to claim 10, wherein said second sensor forms a structural unit with said measuring head and is assembled on it.

14. A textile apparatus comprising means for rotating a generally conical yarn package about its lengthwise axis while feeding yarn thereto along a path which traverses back and forth in the lengthwise direction of the yarn package to allow the yarn being wound onto said package to traverse back and forth between the large and small diameter end portions of said generally conical yarn package; means for determining the instantaneous speed of movement of the yarn in the direction of its length, including signal producing means for generating a yarn package diameter factor associated with the amount of yarn already wound onto said package and a yarn traverse position factor associated with the instantaneous position of the entering yarn along the length of the generally conical package, and signal processing means connected to said signal producing means for calculating said instantaneous yarn speed.

15. Textile apparatus according to claim 14, further comprising means for sensing the cross sectional size of said yarn and producing signals indicative thereof, and means for determining linear positions of abnormalities in the yarn cross section.

16. A yarn speed determination process comprising the steps of obtaining a measure of a nominal value indicative of an average speed at which a yarn is wound in cross coil fashion onto a generally conical cheese bobbin resting upon and being rotated by a driven cam cylinder, obtaining an indication of the instantaneous position relative to the cheese bobbin length of the yarn being wound onto said cheese bobbin, assessing the amount of cheese bobbin diameter increase attributable to the yarn already wound thereon, deriving a correction factor from said cheese bobbin diameter increase and said instantaneous position of said yarn, and applying said correction factor to said nominal value to provide a measure of instantaneous yarn speed.

17. A process for determining the instantaneous speed of a yarn being wound onto a conical cheese bobbin in a cross-coil fashion, comprising the steps of:

establishing a table of correction values by winding a test yarn onto the conical cheese bobbin, measuring the actual diameter of the package wound upon the bobbin, detecting the traversal position of the test yarn along the length of the bobbin, measuring a nominal rotational speed of the bobbin, measuring the actual speed of the test yarn, calculating a correction value on the bases of said nominal and actual speeds, and storing said correction value according to the measured diameter and detected positions; and subsequently winding a yarn onto the bobbin, measuring the diameter of the yarn package wound on the bobbin, detecting the traversal position of the yarn, measuring the nominal speed of the bobbin, and adjusting said nominal speed by a stored correction value determined according to the measured diameter and detected traversal position to thereby derive the instantaneous speed of the yarn being wound on the bobbin.

18. The process of claim 17 wherein said correction value is calculated by dividing the measured actual speed by said nominal speed.

* * * * *